United States Patent
Peng et al.

(10) Patent No.: US 9,632,546 B2
(45) Date of Patent: Apr. 25, 2017

(54) MOUNTING APPARATUS FOR HARD DISK DRIVE AND ELECTRONIC DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wen-Tang Peng, New Taipei (TW); Jie Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 108 days.

(21) Appl. No.: 14/790,741

(22) Filed: Jul. 2, 2015

(65) Prior Publication Data

US 2016/0209891 A1 Jul. 21, 2016

(30) Foreign Application Priority Data

Jan. 20, 2015 (CN) .......................... 2015 1 0026068

(51) Int. Cl.
*G06F 1/18* (2006.01)

(52) U.S. Cl.
CPC .............. *G06F 1/187* (2013.01); *G06F 1/182* (2013.01)

(58) Field of Classification Search
CPC ................................ G06F 1/187; G06F 1/182
See application file for complete search history.

(56) References Cited

U.S. PATENT DOCUMENTS

| | | | |
|---|---|---|---|
| 6,343,009 B1* | 1/2002 | Liu .......................... | G06F 1/184 248/615 |
| 8,749,966 B1* | 6/2014 | Boudreau ............... | G06F 1/187 361/679.33 |
| 2008/0151523 A1* | 6/2008 | Chen ..................... | G11B 33/124 361/807 |
| 2008/0253078 A1* | 10/2008 | Neukam ................. | G06F 1/183 361/679.31 |
| 2009/0224115 A1* | 9/2009 | Zhang .................. | G11B 33/123 248/201 |
| 2010/0085699 A1* | 4/2010 | Lee ........................ | G06F 1/187 361/679.32 |

(Continued)

*Primary Examiner* — Courtney Smith
*Assistant Examiner* — Keith Depew
(74) *Attorney, Agent, or Firm* — Steven Reiss (57) ABSTRACT

A mounting apparatus includes a bottom plate, a supporting frame supported by the bottom plate for receiving a HDD, a receiving frame attached to the bottom plate, a latching member slidably coupled to the supporting frame, and a first elastic member coupled with the latching member. The supporting frame includes a base plate detachably engaging with the bottom plate, two opposite side plates each defining at least one through hole, two pivoting plates pivotably coupled to the side plates, and an extending plate defining an opening. The latching member includes an inserting block to extend through the opening of the extending plate under a resilient force of the first elastic member. Each pivoting plate includes at least one inserting post for extending through the through hole of the corresponding side plate and engaging in the HDD.

14 Claims, 5 Drawing Sheets

(56) References Cited

U.S. PATENT DOCUMENTS

| | | | | |
|---|---|---|---|---|
| 2011/0037358 A1* | 2/2011 | Lung | ............ | G06F 1/187 312/223.2 |
| 2012/0223202 A1* | 9/2012 | Chen | ............ | G06F 1/187 248/309.1 |
| 2013/0037673 A1* | 2/2013 | Li | ............ | G06F 1/187 248/309.1 |
| 2013/0037676 A1* | 2/2013 | Guo | ............ | G06F 1/187 248/310 |

* cited by examiner

MOUNTING APPARATUS FOR HARD DISK DRIVE AND ELECTRONIC DEVICE

FIELD

The subject matter herein generally relates to a mounting apparatus and an electronic device.

BACKGROUND

Hard disk drives (HDDs) are generally mounted in a server with a number of screws.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a mounting apparatus.

Figure 1:
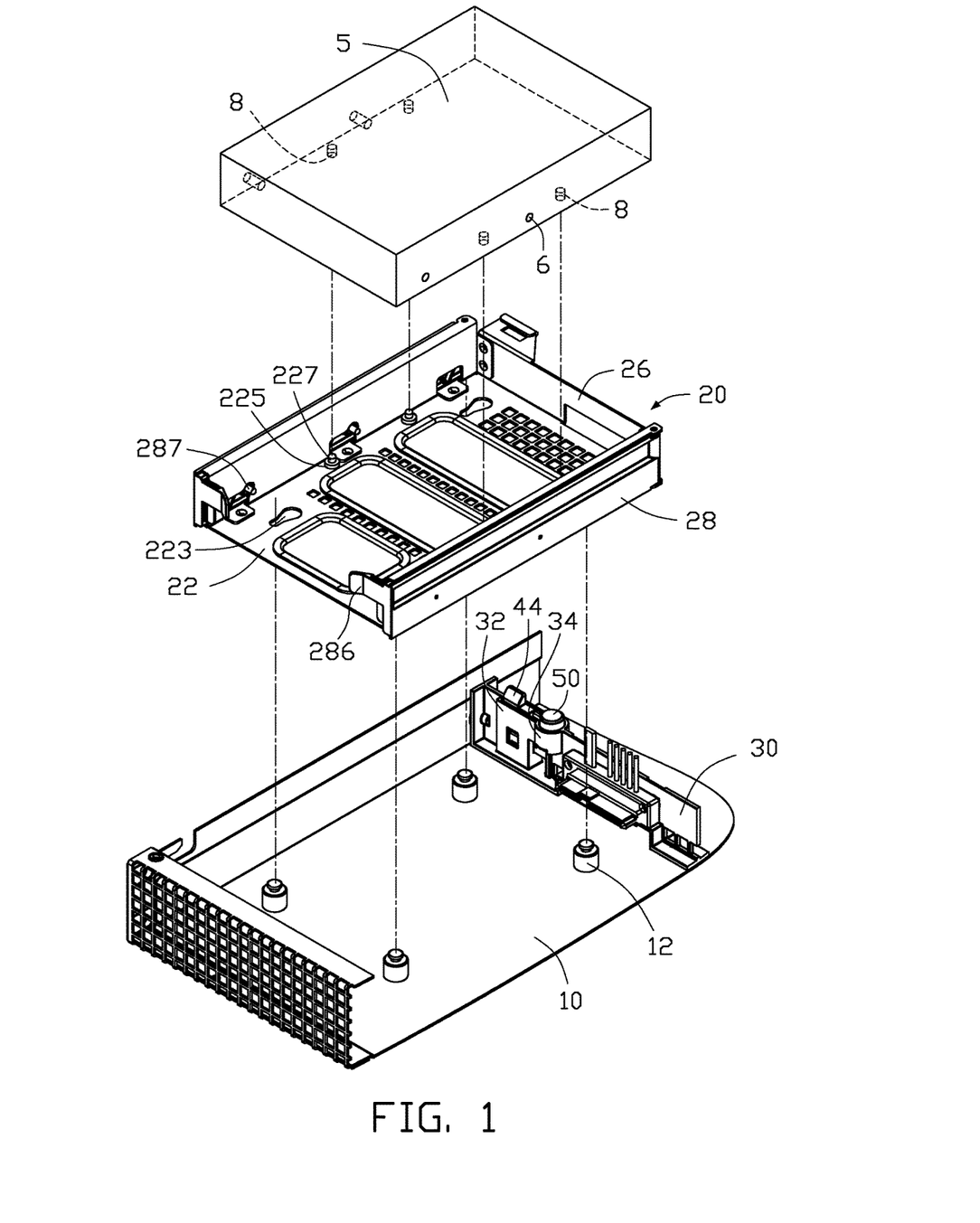
FIG. 1 is an exploded, isometric view of an embodiment of a mounting apparatus and a hard disk drive (HDD).
Figure 4:
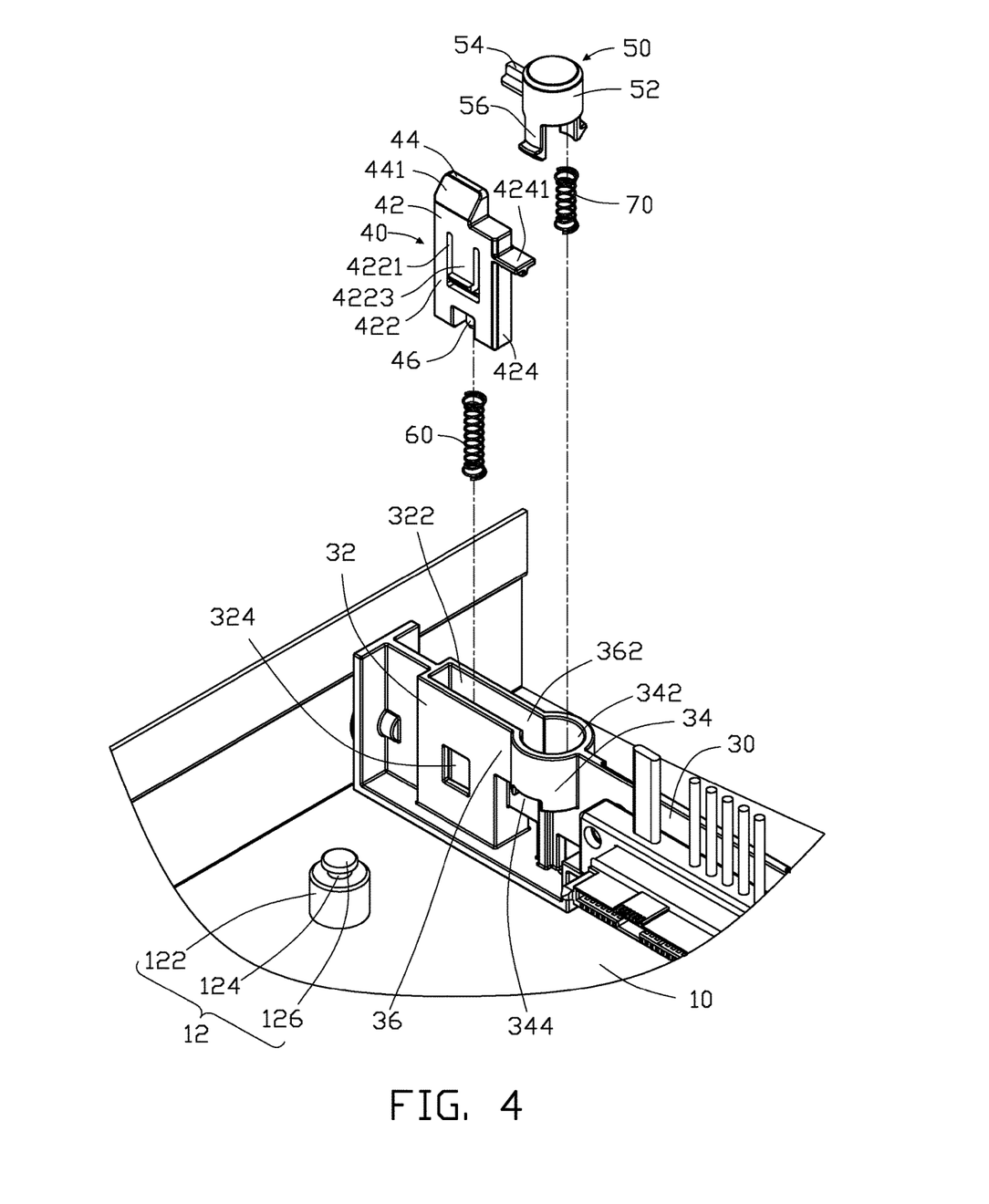
FIG. 4 is an exploded, isometric view of FIG. 3.
Figure 5:
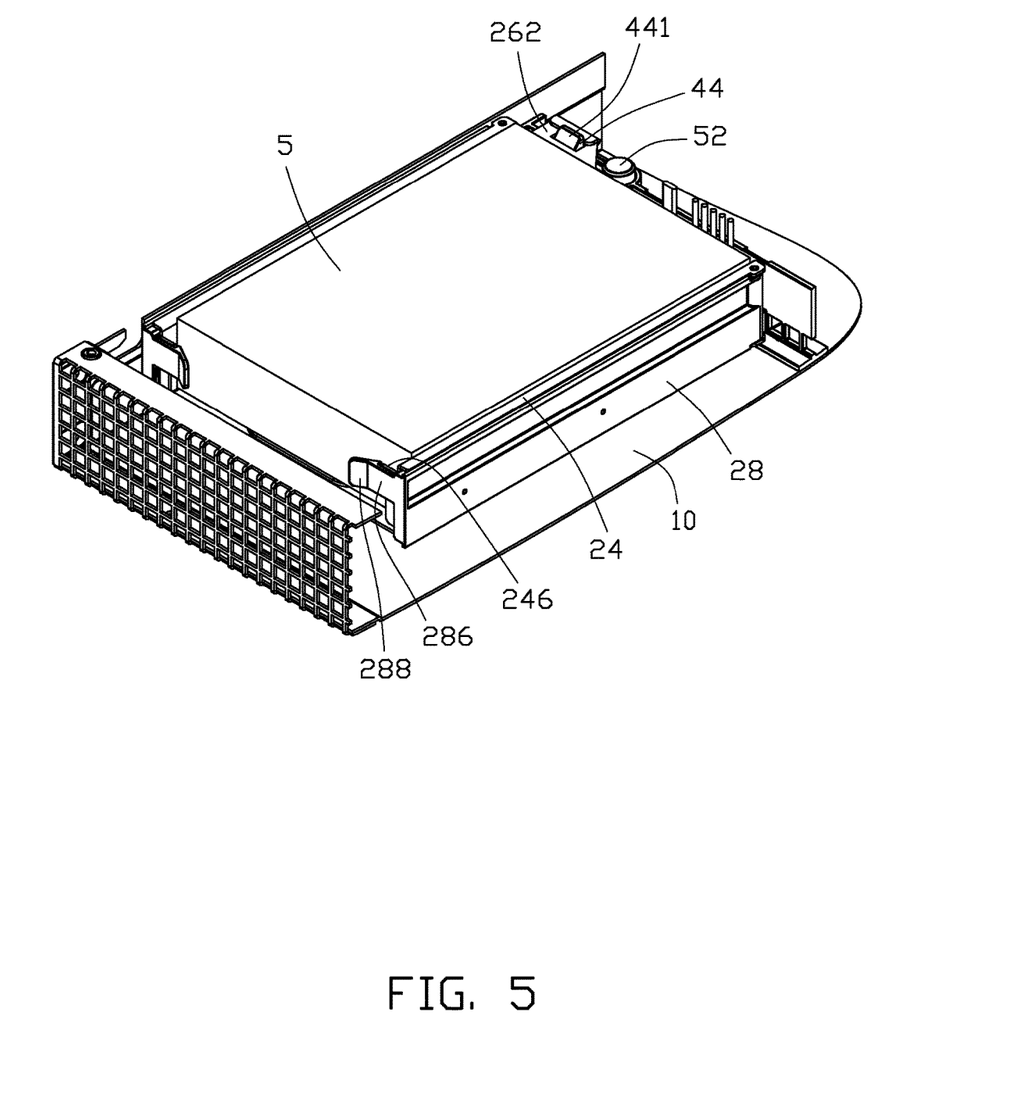
FIG. 5 is an assembled, isometric view of FIG. 1.

FIGS. 1 and 4 illustrate an embodiment of the mounting apparatus and a hard disk drive (HDD) 5. The mounting apparatus comprises a bottom plate 10, a supporting frame 20, a receiving frame 30 attached to the bottom plate 10, a latching member 40, an operating member 50, a first elastic member 60, and a second elastic member 70. Two fixing holes 6 are defined in each of two opposite sides of the HDD 5. Four positioning holes 8 are defined in a bottom surface of the HDD 5. In at least one embodiment, the first elastic member 60 and the second elastic member 70 are springs.

Four engaging posts 12 extend from a top surface of the bottom plate 10, located at one side of the receiving frame 30. Each engaging post 12 comprises a supporting portion 122 extending from the top surface of the bottom plate 10, a neck portion 124 extending from a middle portion of a top surface of the supporting portion 122, and a head portion 126 extending from a top surface of the neck portion 124. All the supporting portions 122 and the neck portions 124 and the head portions 126 are substantially cylindrical. A diameter of each neck portion 124 is less than a diameter of each supporting portion 122 and a diameter of each head portion 126.

Figure 2:
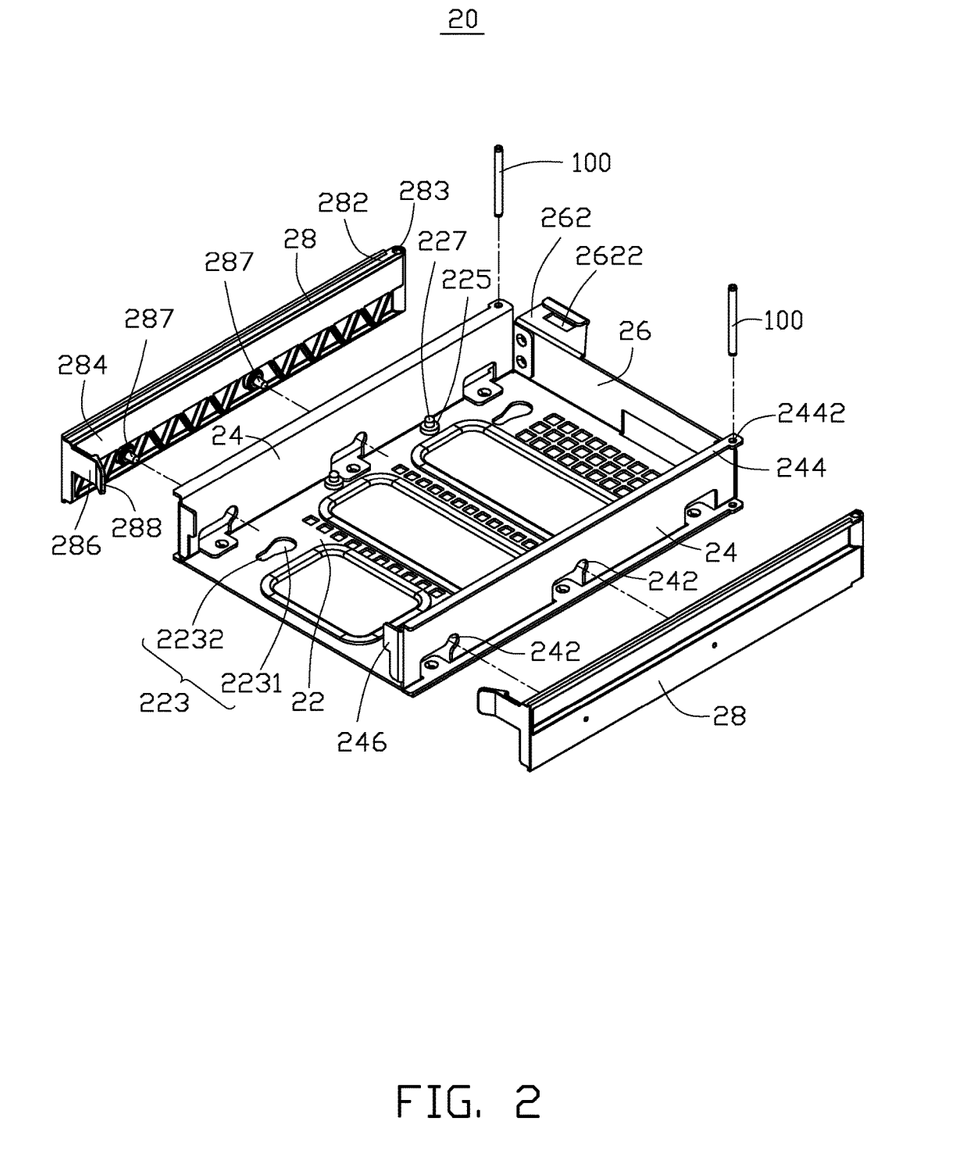
FIG. 2 is an exploded, isometric view of a supporting frame of the mounting apparatus of FIG. 1.

FIG. 2 illustrates that the supporting frame 20 comprises a base plate 22, two side plates 24 extending up from two opposite sides of the base plate 22, an end plate 26 extending up from an end of the base plate 22, and two pivoting plates 28. The base plate 22 defines four spaced engaging holes 223 and four spaced supporting posts 225. A positioning post 227 extends up from a middle of a top surface of each supporting post 225. Each engaging hole 223 comprises a first hole 2231 and a second hole 2232 communicating with a side of the first hole 2231 away from the end plate 26. Each second hole 2232 is narrower than each first hole 2231. Each side plate 24 defines two through holes 242. Two flanges 244 extend outward from a top and a bottom of each side plate 24. A through hole 2442 is defined in an end of each flange 244 near the end plate 26. A latching plate 246 extends from an end of each side plate 24 away from the end plate 26, toward the other side plate 24. An extending plate 262 extends outward from a top of the end plate 26, near one side plate 24. The extending plate 262 defines an opening 2622. Each pivoting plate 28 comprises a first end 282 and a second end 284 opposite to the first end 282. A through hole 283 is defined in each first end 282 of the two pivoting plates 28. A hook 286 extends inward from each second end 284 of the two pivoting plates 28. Two inserting posts 287 extend inward from each pivoting plate 28. An operating plate 288 extends slantingly out from a distal end of each hook 286 away from the pivoting plate 28.

FIG. 4 illustrates the receiving frame 30, the latching member 40, the operating member 50, the first elastic member 60, and the second elastic member 70. The receiving frame 30 comprises a first receiving portion 32, a second receiving portion 34, and a coupling portion 36 coupled between the first receiving portion 32 and the second receiving portion 34. A first receiving groove 322 is defined in the first receiving portion 32, through a top surface and a bottom surface of the first receiving portion 32. A through groove 324 communicating with the first receiving groove 322 is defined in a side of the first receiving portion 32. A second receiving groove 342 is defined in the second receiving portion 34, through a top surface of the second receiving portion 34. Two engaging grooves 344 communicating with the second receiving groove 342 are defined in two opposite sides of the second receiving portion 34. A coupling groove 362 communicating with upper portions of the first receiving groove 322 and the second receiving groove 342 is defined in the coupling portion 36.

Figure 3:
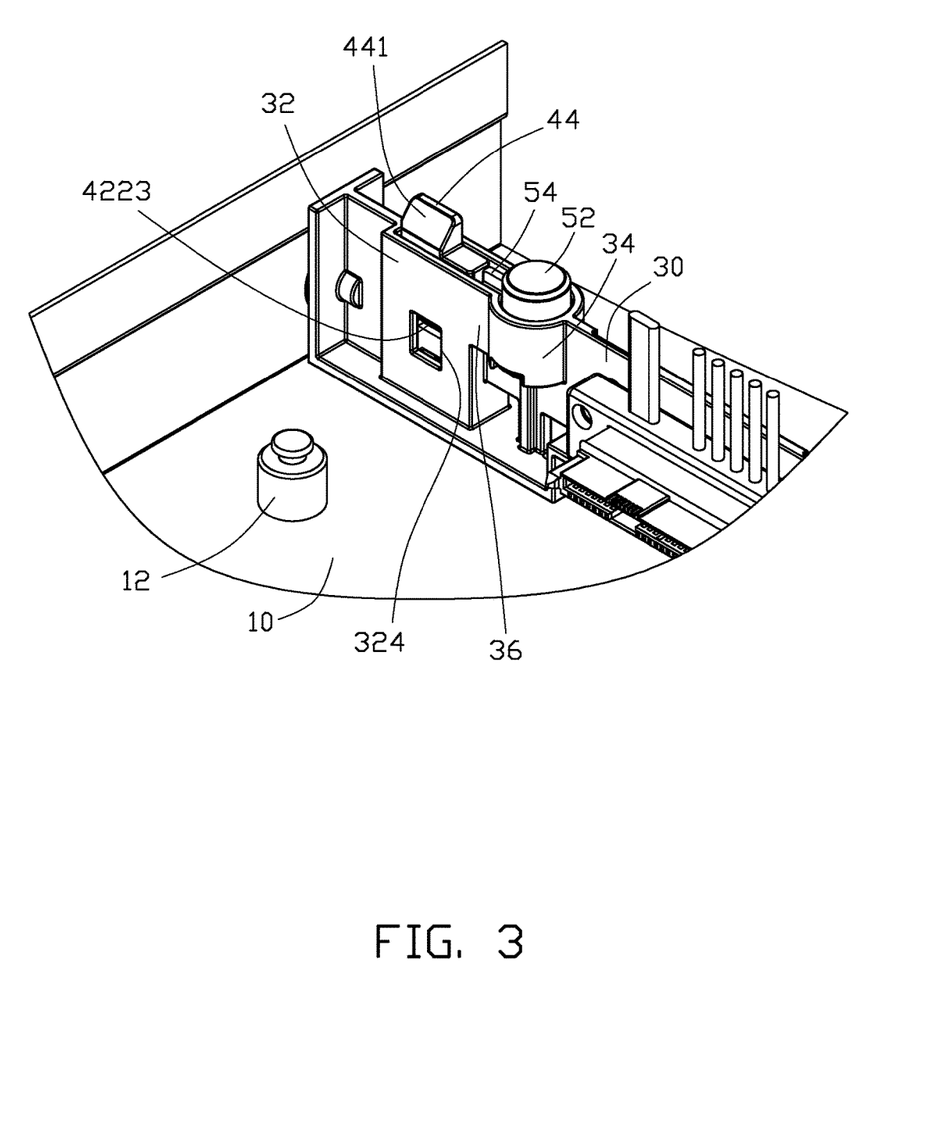
FIG. 3 is an enlarged, isometric view of a portion of FIG. 1.

Referring to FIG. 3, the latching member 40 comprises a main body 42, an inserting block 44 extending upward from a top of the main body 42, and a protruding post 46 extending down from a bottom of the main body 42. The main body 42 has a first side face 422 and a second side face 424 perpendicularly coupled to the first side face 422. A through hole 4221 is defined in the first side face 422. A hook 4223 extends down from a top inside wall bounding the through hole 4221 of the main body 42. A protruding block 4241 extends from an upper portion of the second side face 424. A top of the inserting block 44 comprises a bevel 441.

The operating member 50 comprises a substantially cylindrical button 52, an abutting block 54 extending from a circumference of the button 52, and two opposite hooks 56 extending outward from a bottom of the button 52.

FIGS. 1-5 illustrate the mounting apparatus. The first end 282 of each pivoting plate 28 is placed between the two flanges 244 of a corresponding side plate 24. Two pins 100 extend through the through holes 2442 of the side plates 24 and the through holes 283 of the pivoting plates 28. Thereby, the first ends 282 of the pivoting plates 28 are pivotably coupled to the side plates 24. A top end of the first elastic member 60 is placed around the protruding post 46 of the latching member 40. The latching member 40 with the first elastic member 60 is arranged in the first receiving groove 322 of the first receiving portion 32. The hook 4223 of the latching member 40 engages in the through groove 324 of the first receiving portion 32. A bottom end of the first elastic member 60 abuts against the bottom plate 10. Thereby, the latching member 40 is slidably mounted in the first receiving portion. The protruding block 4241 of the latching member 40 is received in the coupling groove 362 of the coupling portion 36, when the latching member 40 slides up and down in the first receiving portion 32, the hook 4223 slides up and down along the through groove 324. In the natural state, the inserting block 44 extends out of the first receiving groove 322. The second elastic member 70 is received in the second receiving groove 342 of the second receiving portion 34, with a bottom end of the second elastic member 70 abutting against a bottom wall of the second receiving portion 34. The operating member 50 is received in the second receiving groove 342. A bottom of the button 52 of the operating member 50 abuts against a top end of the second elastic member 70. The two hooks 56 of the operating member 50 engage in the two engaging grooves 344 of the second receiving portion 34. Thus, the operating member 50 is slidably mounted in the second receiving portion 34. The abutting block 54 is received in the coupling groove 362 of the coupling portion 36, over the protruding block 4241 of the latching member 40, when the operating member 50 slides up and down in the second receiving portion 34, the two hooks 56 slide up and down along the two engaging grooves 344. In the natural state, a top of the button 52 extends out of the second receiving groove 342.

To secure the HDD 5 to the mounting apparatus, the HDD 5 is received in the supporting frame 20. A bottom surface of the HDD 5 is supported by the supporting posts 225. The positioning posts 227 engage in the positioning holes 8 of the HDD 5. The pivoting plates 28 are pivoted to make the inserting posts 287 extend through the through holes 242 of the side plates 24 and engage in the fixing holes 6 of the HDD 5. The hooks 286 of the pivoting plates 28 hook the latching plates 246 of the side plates 24. Thereby, the HDD 5 is mounted in the supporting frame 20. The supporting frame 20 with the HDD 5 is placed over the bottom plate 10, with the extending plate 262 near the inserting block 44. The head portions 126 of the engaging posts 12 extend through the first holes 2231 of the supporting frame 20. The supporting frame 20 with the HDD 5 is moved toward the receiving frame 30. The neck portions 124 of the engaging posts 12 engage in the second holes 2232 of the supporting frame 20, with the head portions 126 abutting against a top surface of the base plate 22. The extending plate 262 of the supporting frame 20 abuts against the bevel 441 of the inserting block 44. The latching member 40 moves downward and compresses the first elastic member 60. When the inserting block 44 aligns with the opening 2622 of the extending plate 262, the first elastic member 60 elastically recovers to make the inserting block 44 extend through the opening 2622. Thereby, the supporting frame 20 with the HDD 5 is fixed to the bottom plate 10. The supporting frame 20 is supported by the four supporting portions 122 of the four engaging posts 12.

In disassembly of the HDD 5, the button 52 is pressed moving the operating member 50 downward to compress the second elastic member 70. The abutting block 54 of the operating member 50 pushes the protruding block 4241 of the latching member 40 to move the latching member 40 downward and compress the first elastic member 60. The inserting block 44 disengages from the opening 2622. The supporting frame 20 with the HDD 5 moves away from the receiving frame 30, to align the first holes 2231 of the supporting frame 20 with the engaging posts 12. The supporting frame 20 with the HDD 5 is lifted to be detached from the bottom plate 10. The first and second elastic members 60 and 70 elastically recover to restore the latching member 40 and the operating member 50. The operating plates 288 of the pivoting plates 28 are pulled to disengage the hooks 286 of the two pivoting plates 28 from the latching plates 246. The pivoting plates 28 are pivoted to disengage the inserting posts 287 from the fixing holes 6. The HDD 5 can be taken out of the supporting frame 20.

The embodiments shown and described above are only examples. Many details are often found in the art such as the other features of a mounting apparatus and an electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mounting apparatus for fixing a hard disk drive (HDD), the HDD having two opposite sides each defining at least one fixing hole, the mounting apparatus comprising:
   a bottom plate having a plurality of engaging posts extending up from a top surface of the bottom plate;
   a supporting frame supported by the bottom plate for receiving the HDD, the supporting frame comprising:
      a base plate defining a plurality of engaging holes, the engaging posts of the bottom plate engaging in the engaging holes and engaging with a top surface of the base plate;
      two side plates extending up from two opposite sides of the base plate, each side plate defining at least one through hole;
      two pivoting plates pivotably coupled to outer sides of the two side plates, each pivoting plate comprising at least one inserting post; and an extending plate defining an opening, when the pivoting plates are pivoted toward the side plates, the inserting posts extend through the through holes of the side plates for engaging in the fixing holes of the HDD;

a receiving frame attached to the bottom plate and located at one side of the supporting frame;

a latching member coupled to the receiving frame and configured to slide up and down relative to the bottom plate, the latching member comprising an inserting block; and a first elastic member coupled to the latching member to urge the inserting block of the latching member to extend out of the opening of the extending plate.

2. The mounting apparatus of claim 1, further comprising an operating member and a second elastic member, a protruding block extends from a side of the latching member near the operating member, an abutting block over the protruding block extends from a side of the operating member near the latching member, when the operating member moves downward, the abutting block pushes the protruding block to move the latching member downward, the second elastic member is arranged between the receiving frame and the operating member to restore the operating member.

3. The mounting apparatus of claim 2, wherein the receiving frame comprises a first receiving portion, a second receiving portion, and a coupling portion coupled between the first receiving portion and the second receiving portion, a first receiving groove is defined in the first receiving portion, through a top surface of the first receiving portion, a second receiving groove is defined in the second receiving portion, through a top surface of the second receiving portion, a coupling groove communicating with the first receiving groove and the second receiving groove is defined in the coupling portion, the latching member comprises a main body received in the first receiving groove, the operating member comprises a button received in the second receiving groove, the inserting block extends upward from the main body, the protruding block extends from the main body and is received in the coupling groove, the abutting block extends from the button and is received in the coupling groove.

4. The mounting apparatus of claim 3, wherein a through groove communicating with the first receiving groove is defined in a side of the first receiving portion, a hook extends from the main body to engage in the through groove, the hook is capable of sliding along the through groove up and down.

5. The mounting apparatus of claim 3, wherein two engaging grooves communicating with the second receiving groove are defined in two opposite sides of the second receiving portion, two opposite hooks extending from a bottom of the button, the two hooks are capable of sliding along the two engaging grooves up and down.

6. The mounting apparatus of claim 3, wherein the first receiving groove extends through a bottom surface of the first receiving portion, a protruding post extends from a bottom of the main body, the first elastic member is received in the first receiving groove, a top end of the of the first elastic member is placed around the protruding post, a bottom end of the first elastic member abuts against the bottom plate.

7. The mounting apparatus of claim 1, wherein the supporting frame further comprises an end plate extending upward from an end of the base plate near the receiving frame, the extending plate extends from a top of the end plate toward the receiving frame, the two pivoting plates are pivotably coupled to ends of the two side plates near the end plate.

8. The mounting apparatus of claim 7, wherein a latching plate extends inward from an end of each side plate away from the end plate, a hook extends inward from an end of each pivoting plate away from the end plate, when the pivoting plates are pivoted toward the side plates, the two hooks hook the two latching plates.

9. The mounting apparatus of claim 8, wherein an operating plate extends slantingly out from a distal end of each hook away from the corresponding pivoting plate.

10. The mounting apparatus of claim 7, wherein two flanges extend outward from a top and a bottom of each side plate, a through hole is defined in an end of each flange near the end plate, a through hole is defined in an end of each pivoting plate near the end plate, two pins extend through the through holes of the two side plates and the through holes of the two pivoting plates, to pivotably couple the pivoting plates to the side plates.

11. The mounting apparatus of claim 1, wherein the base plate defines a plurality of supporting posts for supporting the HDD, a positioning post extends from a middle of a top surface of each supporting post, for engaging in a corresponding positioning hole of a bottom surface of the HDD.

12. An electronic device comprising:
a hard disk drive (HDD) comprising two opposite sides each defining at least one fixing hole; and
a mounting apparatus comprising:
a bottom plate, wherein a plurality of engaging posts extends from a top surface of the bottom plate;
a supporting frame receiving the HDD, and comprising a base plate, two side plates extending up from two opposite sides of the base plate, two pivoting plates pivotably coupled to the two side plates, and an extending plate, wherein the base plate defines a plurality of engaging holes, each side plate defines at least one through hole, each pivoting plate comprises at least one inserting post, the extending plate defines an opening;
a receiving frame attached to the bottom plate and located at one side of the supporting frame;
a latching member coupled to the receiving frame and capable of sliding up and down relative to the bottom plate, the latching member comprising an inserting block configured to extend through the opening of the extending plate; and
a first elastic member coupled with the latching member to restore the latching member;
wherein the two pivoting plates are pivoted to make the inserting posts extend through the through holes of the two side plates and engage in the fixing holes of the HDD, the supporting frame is placed on the bottom plate with the engaging posts engaging in the engaging holes and engaging with a top surface of the base plate, the first elastic member urge the latching member to allow the inserting block to extend out of the opening of the extending plate.

13. The electronic device of claim 12, wherein the mounting apparatus further comprises an operating member and a second elastic member, a protruding block extends from a side of the latching member near the operating member, an abutting block over the protruding block extends from a side of the operating member near the latching member, when the operating member moves downward, the abutting block pushes the protruding block to move the latching member downward, the second elastic member is arranged between the receiving frame and the operating member to restore the operating member.

14. The electronic device of claim 13, wherein the receiving frame comprises a first receiving portion, a second receiving portion, and a coupling portion coupled between the first receiving portion and the second receiving portion, a first receiving groove is defined in the first receiving portion, through a top surface of the first receiving portion, a second receiving groove is defined in the second receiving portion, through a top surface of the second receiving portion, a coupling groove communicating with the first receiving groove and the second receiving groove is defined in the coupling portion, the latching member comprises a main body received in the first receiving groove, the operating member comprises a button received in the second receiving groove, the inserting block extends upward from the main body, the protruding block extends from the main body and is received in the coupling groove, the abutting block extends from the button and is received in the coupling groove.

* * * * *